(12) United States Patent
Rowe et al.

(10) Patent No.: US 7,717,029 B2
(45) Date of Patent: May 18, 2010

(54) GRILL ASSEMBLY

(75) Inventors: Thomas Rowe, Dayton, WA (US); Thomas J. Drach, Hood River, OR (US)

(73) Assignee: Charcoal Companion Incorporated, Emeryville, CA (US)

( * ) Notice: Subject to any disclaimer, the term of this patent is extended or adjusted under 35 U.S.C. 154(b) by 1459 days.

(21) Appl. No.: 10/917,544

(22) Filed: Aug. 11, 2004

(65) Prior Publication Data

US 2005/0172948 A1 Aug. 11, 2005

Related U.S. Application Data

(60) Provisional application No. 60/541,666, filed on Feb. 5, 2004.

(51) Int. Cl.
*A47J 37/06* (2006.01)
(52) U.S. Cl. .............................. 99/398; 99/397; 99/394; 99/427
(58) Field of Classification Search .................. 99/345, 99/397, 398, 421 A, 427, 394, 393, 385; 126/30, 23, 9 B, 25 AA
See application file for complete search history.

(56) References Cited

U.S. PATENT DOCUMENTS

| | | | | |
|---|---|---|---|---|
| 583,063 | A | | 5/1897 | Martinie |
| 679,588 | A | * | 7/1901 | Anderson et al. .......... 220/4.22 |
| 1,619,159 | A | | 3/1927 | Schoenweitz |
| 2,214,417 | A | | 9/1940 | Homer |
| 2,297,825 | A | * | 10/1942 | Bobo ........................... 99/397 |
| 2,501,940 | A | * | 3/1950 | Hurl ............................ 16/425 |
| 2,542,109 | A | * | 2/1951 | Benson ........................ 99/397 |
| 2,846,941 | A | | 8/1958 | Goodwin |
| 3,042,439 | A | | 7/1962 | King |
| 3,045,582 | A | * | 7/1962 | Wells ........................... 99/397 |
| 4,095,832 | A | * | 6/1978 | Slinker .......................... 294/8 |
| 4,171,144 | A | | 10/1979 | Rodriguez |
| 4,492,152 | A | * | 1/1985 | DeSantis ...................... 99/397 |
| 4,510,855 | A | | 4/1985 | Avner |
| 5,048,882 | A | | 9/1991 | Fielding et al. |
| 5,560,286 | A | | 10/1996 | Fabrikant et al. |
| 5,740,724 | A | | 4/1998 | Fabrikant et al. |
| 5,782,173 | A | | 7/1998 | Fabrikant et al. |
| 5,970,856 | A | | 10/1999 | Fabrikant et al. |

(Continued)

*Primary Examiner*—Reginald L Alexander
(74) *Attorney, Agent, or Firm*—Donald L. Beeson; Beeson Skinner Beverly

(57) ABSTRACT

A grill assembly for cooking food items over a heat source includes a grill body capable of holding the food items and at least one grill body handle having a grip end and a grill body engagement end. The grill body is provided with a handle engagement structure which is adapted to rotatably hold the grill body engagement end of the grill body handle so as to allow the grill body to be turned over on the handle while holding the grip end of the handle. The handle engagement structure of the grill is preferably provided in the form of handle insertion structure such as one or more insertion sleeves on the periphery of the grill body. Suitably two spaced apart handles are provided which rotatably engage the grill body whereby the grill body can be turned over on the two handles without the user altering his or her grip on the handles. Preferably the handle or handles are removably engaged in the grill body such that they can be removed when they are not being used to maneuver the grill body over the heat source.

7 Claims, 4 Drawing Sheets

U.S. PATENT DOCUMENTS 6,644,176 B2 11/2003 Prip
6,712,412 B2 3/2004 Kahler et al.
6,813,993 B1 * 11/2004 Liu .......................... 99/421 A

* cited by examiner

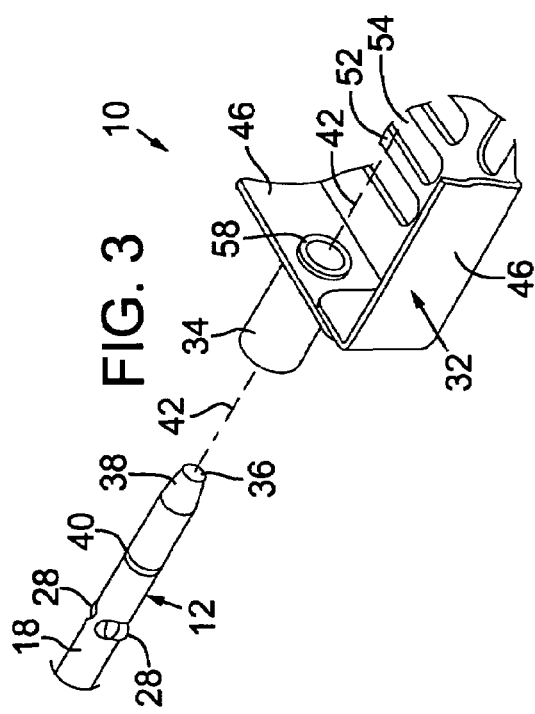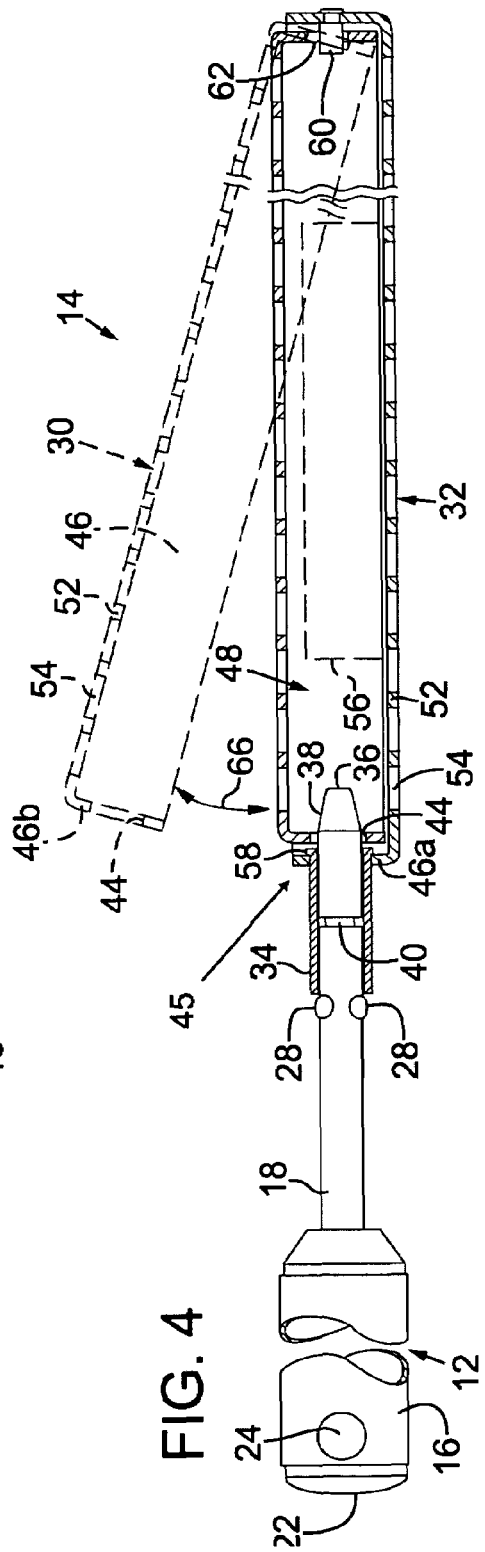

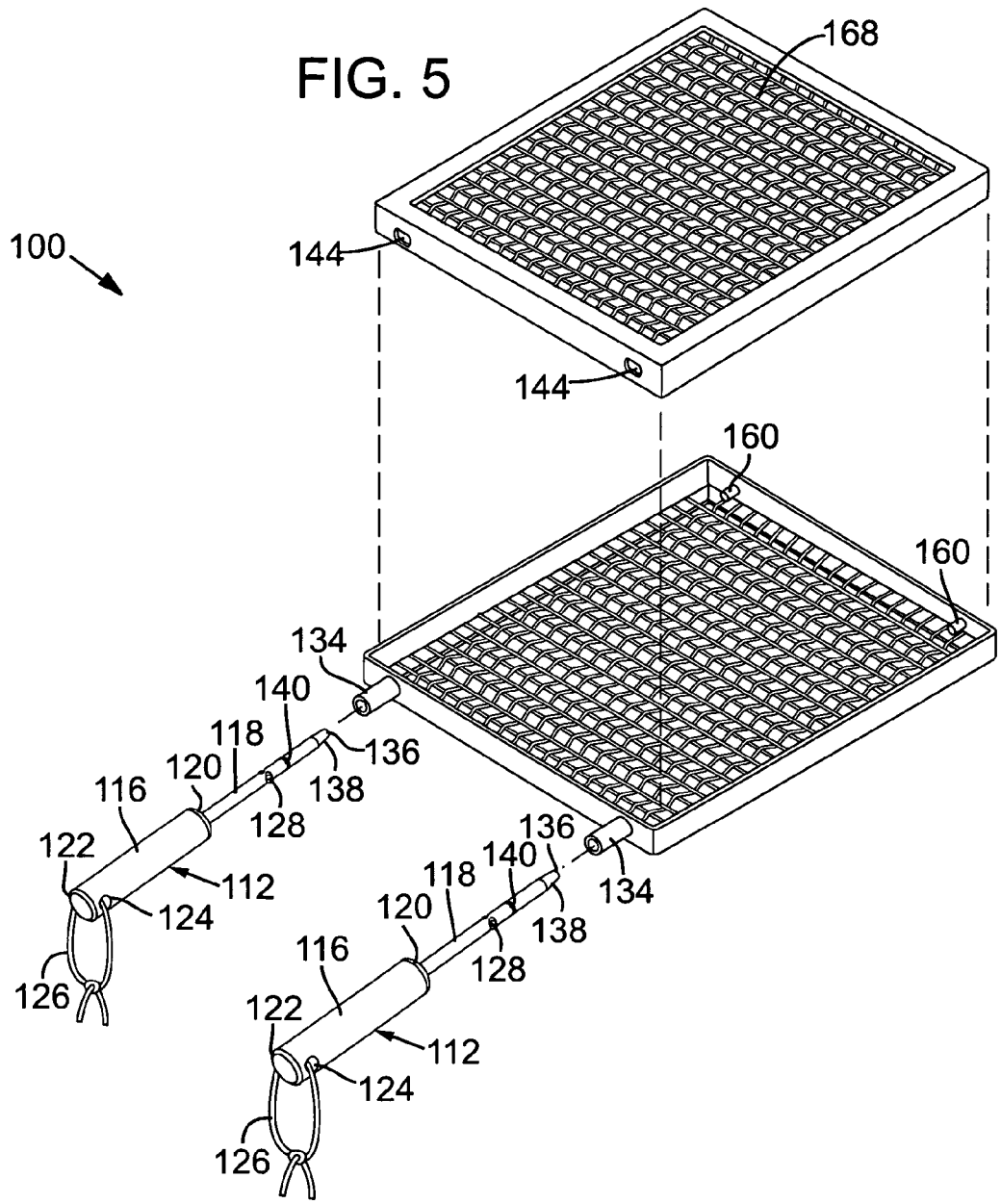

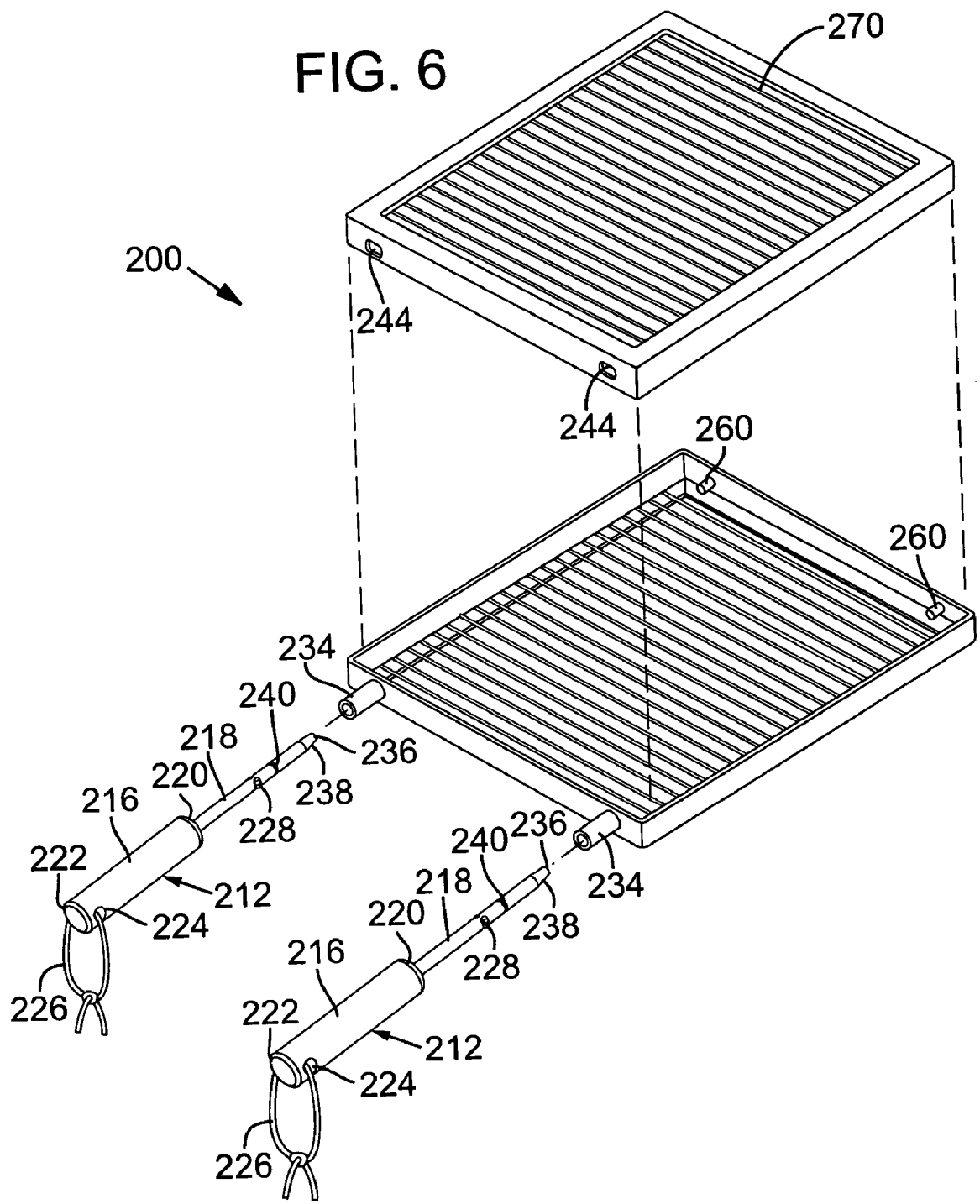

GRILL ASSEMBLY

CROSS-REFERENCE TO RELATED APPLICATIONS

This application claims the benefit of U.S. Provisional Patent Application Ser. No. 60/541,666, filed Feb. 5, 2004, the entire contents being incorporated herein by reference.

BACKGROUND OF THE INVENTION

Outdoor barbecues, cookers or stoves are a popular way to prepare food away from the kitchen of a home. Conventionally, outdoor barbecues, cookers or stoves include an open support over a heat source such as a collection of charcoal briquettes or one or more gas burners. The open support, or grill, is commonly constructed of a number of horizontally disposed, parallel elements connected to a frame. The elements of the grill are most often fashioned of relatively thin, cylindrical metal. The diameter of the cylindrical stock material is often substantially smaller than the spacing between cylindrical elements, leaving a fairly open structure upon which the food to be grilled may be placed.

A grilling surface as described above may be sufficient for cooking large foodstuffs or for cooking pieces of food which tend to stay whole during the cooking process. However, the described cooking surface may not be adequate for cooking smaller pieces of food, or for cooking food which flakes apart or breaks into smaller pieces during the cooking process; these smaller pieces of food may easily fall through the cooking surface and be lost to the person doing the cooking. Having to handle and/or turn the food during the cooking process may only exacerbate these problems.

Heretofore various grilling devices have been devised for holding small food items on or over a grill so as to prevent the food items from falling into the heat source below. Such prior grilling devices include baskets such as disclosed in U.S. Pat. No. 5,048,882, to Fielding et al. One drawback of such prior grilling devices is the relative difficulty of turning the food over in a controlled manner on the grill or other support for cooking the food from opposite sides. Often the devices are provided with elongated handles fixed to a food holding container for placing and maneuvering the food container on the grill. In such devices loose food items have to be jostled in an uncontrolled manner to cook the food from different sides or the entire device has to be turned over often in an awkward maneuver that may require the user to alter his or her grip of the device. A need exists for a grilling device the facilitates the turning other of the food held by the food holding device on a barbecue grill or other cooking surface. A need also exists for a such a grilling device wherein a handle or handles are provided that are optionally removable from the main food holding structure of the device. A need still further exists for such a grilling device wherein an improved food holding body or structure is optionally provided.

SUMMARY OF THE INVENTION

In one aspect of the present invention, a grill assembly for cooking food items over a heat source is provided wherein food items held by a grill body can be easily turned over by hand while comfortably gripping the assembly. In another aspect of the invention, a grill assembly is provided having at least one handle that preferably can be readily engaged and disengaged from the assembly while cooking the food items. In another preferred aspect of the invention, a grill assembly is provided that readily retains a quantity of small food items for ease of turning over above a heat source.

The grill assembly of the invention is comprised of a grill body capable of holding food items and at least one grill body handle having a grip end and a grill body engagement end. A handle engagement structure is provided on the grill body to rotatably hold the engagement end of the grill body handle and to allow the grill body to be turned over on the handle while the user holds onto the grip end of the handle. In this manner the food items held by the grill body can be turned over on a grill or the like without the user having to alter his or her grip on the handle. In the preferred embodiment, the grill body of the grill assembly has a generally planar geometry and a defined periphery with the handle engagement structure being located on the periphery of the grill body. In the case of two handles, the handles would be spaced apart along the grill body periphery to facilitate maneuvering of the grill body. It is contemplated that the grill assembly will be provided with either one or two rotatably engaged handles, however, it will be understood that it is not intended that the invention be limited to a grill assembly with a particular number of handles.

In the preferred embodiment of the invention, the grill body's handle engagement structure is an insertion structure and the at least one grill body handle is insertable into and rotatable within the grill body's handle insertion structure. The grill body handle can also preferably be removed from the grill body after the grill body and the food items held thereby have been place or turned over on or the grill or other cooking surface. Preferably, the grill body engagement end of the handle is in the form of an insertion rod which is removably inserted by the user into a correspondingly sized insertion opening in the grill body insertion structure, after which the grill body can be lifted and turned over on the handle's insertion rod. Protrusions can optionally be provided on the handle's insertion rod to limit the depth of insertion of the .rod into the grill body insertion structure. A suitably form of an insertion body is an insertion sleeve that extends from the periphery of a planar grill body.

In still another and optional embodiment of the invention, the assembly's grill body is comprised of a pair of grill members that can be joined together to hold food items to be cooked. In this embodiment the at least one grill body handle acts to hold the grill members together when the handle engagement end of the handle is engaged with the grill body's handle engagement structure after the grill members are joined together.

Thus, it can be seen that a primary object of the present invention is to provide a new grill assembly that allows for the easy manipulation of food items, and particularly but not exclusively small food items, on a cooking grill or the like. Other objects of the invention will be apparent from this specification and the accompanying drawings.

BRIEF DESCRIPTION OF THE DRAWINGS

FIG. 3 is a fragmentary view thereof showing in greater detail the insertion of one of the handles into the grill body of the grill assembly.

FIG. 4 is a side elevation sectional view thereof, showing the grill in a closed position and, in phantom, in an open position.

FIG. 5 is an exploded, top perspective view of an alternative embodiment of the grill assembly of FIG. 1.

FIG. 6 is an exploded, top perspective view of another alternative embodiment of the grill assembly of FIG. 1.

DETAILED DESCRIPTION OF THE PREFERRED EMBODIMENT

Figure 1:
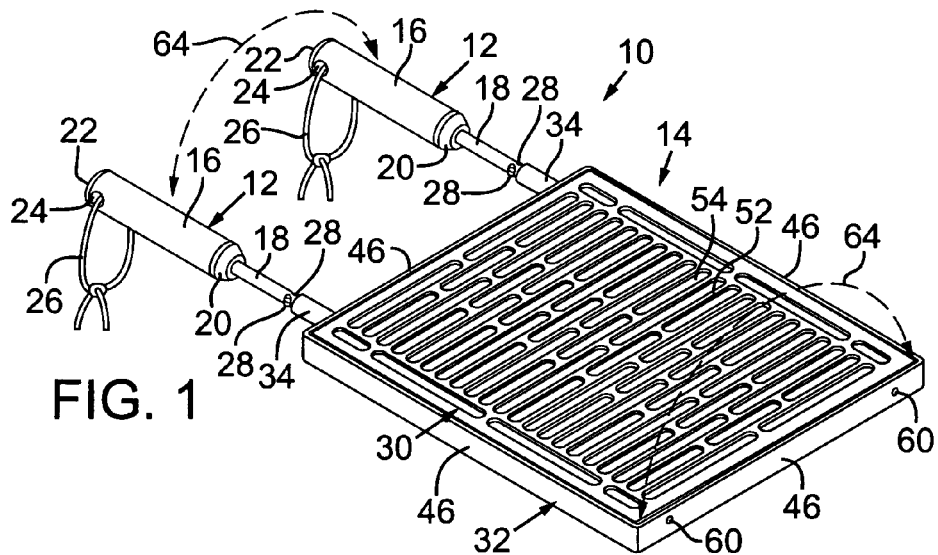
FIG. 1 is a top perspective view of a grill assembly in accordance with the invention.

FIG. 1 depicts an exemplary embodiment of a grill assembly 10 used for cooking food over a heat source, designed in accordance with the present invention. In a preferred embodiment, grill assembly 10 typically includes one or more handles 12 and a grill body 14 into which the handles can be removably and rotatably inserted. Alternatively, there may be occasions when it is preferable to make a grill assembly which has its handles non-removably but rotatably attached. This modification may be made without departing from the spirit of the present disclosure. Handles 12 may be used to support grill body 14 when it is removed from or placed on a heat source. They may also be designed for use in turning over the grill assembly.

Each of the illustrated handles 12 includes a grip end having a grip 16 and a grill body engagement end in the form of an insertion rod 18. For ease of grasping, grip 16 is suitably elongated with a proximal end 20 near to the grill body 14 and a distal end 22 remote from the grill body 14. However, it will be understood that the grip could have other suitable designs and shapes. Grip 16 may also be made of any material suitable for being grasped by a human hand. For example, material for grip 16 may include, but is not limited to wood, a suitable metal (such as steel), plastic, rubber, silicone, etc. It is preferable that the materials not be conductive to heat or that the configuration of the grip be such that heat is easily dissipated. For example, the handle may be constructed of an open, rigid metallic coil.

Grip 16 may include, near its distal end 22, one or more holes 24 which may be used for attaching a lanyard 26. Holes 24 may be any suitable shape for holding lanyard 26. Lanyard 26 may be used as a support for hanging the removable handles 12 on, for example, a storage hook when they are not in use. Therefore, lanyard 26 may be made of any suitable material that will allow it to perform this function, such as leather, twine, plastic, metal, rubber, nylon, etc.

Grip 16 is normally non-removably attached to the insertion rod 18. Alternatively, the handle could be designed such that the grip and rod are removably attached to each other. Rod 18 may be made of any material suitable for the task of being removably inserted into, and supporting, grill body 14, such as metal, wood, rubber, plastic, etc. In a preferred embodiment, the design of rod 18 may include one or more protrusions 28 and a rod groove 40 (best seen in FIG. 2) at its circumference. The free end of rod 18 has a tip 36 suitable for insertion into the grill body 14, which tip 36 may or may not have a taper 38 (seen more clearly in FIG. 2) to facilitate the ease of its insertion into grill body 14 as hereafter described. For heat resistance, sturdiness, and ease of use, a preferred embodiment of handle 12 may typically include a plastic grip 16 and a metallic rod 18.

Protrusions 28 (see FIG. 2) may be disposed on opposite sides of rod 18, or they may be disposed more closely to one another. Alternatively, there may be only one protrusion on the rod 18 of each handle 12. Although shown in the figures as having a semicircular shape, protrusions 28 may assume a triangular shape, a hemispherical shape, a square shape, etc. Protrusions 28 may serve to prevent the user of the handles from inserting the handles too deeply into the grill body; preventing deep insertion of the rod may prevent the tip of the rod from contacting the food held by the grill body. Rod groove 40 may be positioned between protrusions 28 and tip 36 such that rod groove 40 may serve as a second, visual indicator of the extent of insertion of handle 12 into grill body 14. In a preferred embodiment, rod groove 40 may be positioned such that it serves as an indicator that the rod has been inserted into one grill member of the grill body, but not into the second grill member of the grill body (i.e., an indicator that the two grill members are not yet removably held together by the handle).

Grill body 14 of grill assembly 10 is seen to include both a top grill member 30 and a bottom grill member 32. The shown top and bottom grill members of grill body 14 are sized such that they may be joined together by nesting one within the other. Although shown as a two-piece construction, the grill body may include any number of pieces and may be constructed for holding food items other than in the manner illustrated and described herein.

Top grill member 30 and bottom grill member 32 of grill body 14 preferably include engagement walls 46 at their peripheries, such that the top and bottom grill members and their associated engagement walls define a central enclosure identified at 48. The limits of the central enclosure may be roughly defined as the space bounded by the four corners of the top grill member 30 and bottom grill member 32, as shown by dashed lines 50 in FIG. 2. While engagement walls 46 may take the form of solid walls around the entire periphery of the top and bottom grill members as shown in the present disclosure, the engagement walls may in fact be smaller fragments of the larger wall, or even an open grating or mesh. A minimal engagement wall might consist only of the portions of the engagement wall (wall fragments) necessary to support insertion structures at one location and engagement members at an opposed location (both described below). In addition, the grill body may be designed such that the engagement walls (whether in the form of a wall or a fragment thereof) are normally, but not necessarily, at the periphery of the grill members. In some cases it may be advantageous to design a grill body which has its engagement walls at positions other than the peripheries of the grill members.

As is clear from the figures, top grill member 30 and bottom grill member 32 may be constructed so that they have an open grillwork surface, composed of grill slats 52 and grill openings 54. The combination of grill slats 52 and grill openings 54, and their relative sizes, makes it possible to place food in the central enclosure of the grill assembly and to cook it without the food exiting the container. The relative sizes, spacing, and placement of the grill slats and openings, as shown in the figures, also prevents the grill body 14 from warping under conditions of extreme heating. The absence of appreciable warping of the grill body, even when it is hot, allows the grill assembly to be easily opened and closed before, during, and after the cooking process.

Figure 2:
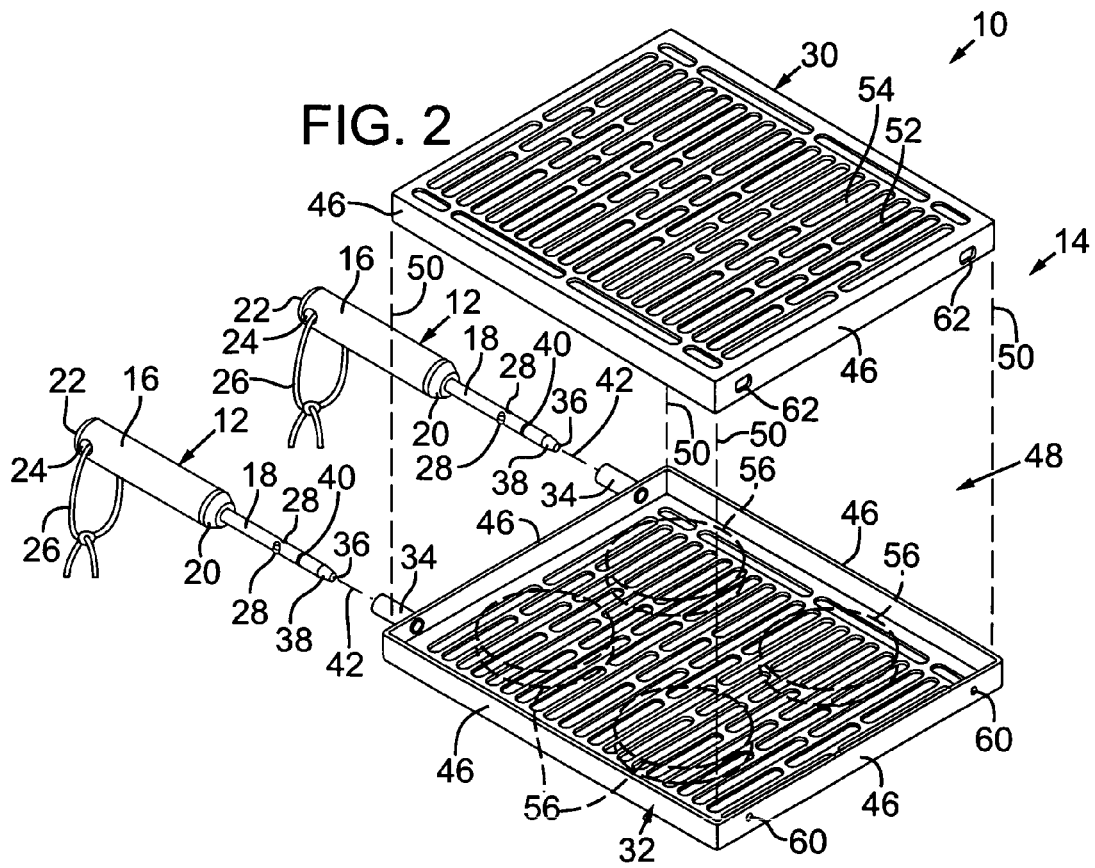
FIG. 2 is an exploded, top perspective view of the grill assembly of FIG. 1.

The exploded view of FIG. 2 shows how the various parts of the grill assembly interact and join together during use. It is seen that the handles engage the grill body along a straight engagement side edge 45, which in the illustrated embodiment is formed by two of the overlapping engagement walls 46a, 46b of the nested grill members 30, 32. The handles extend from this edge of the grill body to allow for the manipulation and turning over of the grill body and its captured food items on a cooking grill or the like. Shown in phantom outlines 56 are illustrative food items that can be cooked using a grill assembly in accordance with the invention. Generally, the design of the grill body is such that the food items may be held during cooking, yet exposed to the heat and/or flame of the cooking device. In the illustrated embodiment the food items are contained within the central enclosure 48 of grill body 14 while the food items are exposed to heat due to the presence of the grill slats 52 and grill openings 54. It is understood that the dashed lines could represent most any food that a user would want to cook on an outdoor grill. For example, a user could cook hamburgers, chicken, steak, vegetables, pork, many types of fish, etc.

FIGS. 3 and 4 best show the insertion points where the insertion rods 18 of the grill body handles 12 fit into and rotatably engage the grill body 14. Generally, the grill body is provided with one or more handle engagement structures capable of rotatably holding the engagement end of at least one grill body handle so that the grill body can be turned over on the handle or handles as hereinafter described in greater detail. These engagement structures could be attached anywhere around the periphery of the grill body for receiving and holding any number of handles. In the illustrated embodiment the engagement structures for the grill body handles are in the form of insertion structures into which the engagement end of the grill body handles can be removably inserted. More specifically, they include spaced apart cylindrical sleeves 34 having insertion bores 35 sized to rotatably receive the insertion rods of the grill body handles 12, which are attached to and which project outwardly from one of the engagement walls 46*a* of the rectangular bottom grill member 32. The insertion structure also includes associated insertion openings 44 in engagement wall 46*b* of the correspondingly shaped top grill member, which nests inside of the bottom grill member's outer engagement wall 46*b* when the grill members are closed. When the grill members are closed, the openings 44 align with the insertion sleeve bores 35 in order to receive the tips 36 of the handle insertion rods when the handles are fully inserted. The insertion sleeves preferably include a small flanged portion 58 at the ends of the sleeves that project behind engagement wall 46*a*.

It is noted that the grill body insertion structures can have many different shapes and sizes. In the illustrated embodiment each of the grill body handles is provided with an insertion rod having a circular cross-section which can be removably slid into the cylindrical bore 35 of one of the insertion sleeves 34 along an insertion axis 42. The insertion openings 44 on engagement wall 46*b* of the top gill member 30 are also suitably circular in shape. Preferably, the openings 44 are sized such that the tips 36 of the handle insertion rods fit closely within these openings when the rods are fully inserted into the sleeves after the top and bottom grill members 30, 32 are closed. It will be appreciated that other insertion rod and opening sizes and shapes are possible which permit the grill body handles to slidably engage the grill body.

Full insertion of the grill body handles into the insertion sleeves 34 and insertion openings 44 act to couple the grill members 30, 32 together and prevent opening of the grill assembly when it is moved to or from the cooking surface and/or turned over on the cooking surface. In addition to the inserted grill body handles, at least one additional engagement mechanism is preferably provided to hold the grill members together. In the illustrated embodiment, the additional engagement mechanism is comprised of engagement members 60 in the form of projections or nubs located on the rear engagement wall of bottom grill member 32 and corresponding engagement openings 62 on the rear engagement wall of top grill member 30.

It shall be observed that the maximum extent of insertion of the handle insertion rods 18 into sleeves 34 is controlled by the placement of protrusions 28 along the length of the rods. The maximum extent of insertion is preferably set so that the tip 36 of the insertion rods is able to extend through the insertion opening 44 on the front engagement wall 46*b* of the top grill member when it is in its closed position, without significant penetration into the grill body enclosure 48.

FIG. 4 depicts the relative positions of the top grill member 30 and bottom grill member 32 when the grill body is being opened (top grill member 30 shown in phantom) and when it is completely closed (top grill member 30 shown in solid lines). FIG. 4 also shows the insertion rods 18 of the grill body handles 12 inserted fully into insertion sleeves 34 so that, with the top grill member in its shown closed position, the tips 36 of the handle insertion rods extend through insertion openings 44; it still further shows the coming together of engagement members 60 and their associated engagement openings 62 at the rear of the grill body as the top grill member is closed onto the bottom grill member as denoted be arrow 66. While the engagement structures for holding the top and bottom grill members together (the handle engagement structures 34, 44 and members/openings 60, 62) are shown to be on opposite sides of the grill body, it is contemplated that, for a grill body that employs two joinable grill member as illustrated, these structures could have other relative positions on the grill body.

Other possible variations is the constructional details of the illustrated version of the grill body grill include the reversal of the engagement members 60 and engagement openings 62 on the top and bottom grill members of the grill body. While the engagement members and engagement openings necessarily reside on different grill members of the grill body, they could be located elsewhere about the grill. Working in conjunction with the grill body handles, they form a second mechanism at a second position for holding together the separable grill members 30, 32 when the grill body is being moved or turned over.

A brief description of the use of a grill assembly designed according to the details of the present disclosure will illuminate how the various parts of the present disclosure come together into a usable whole. This description will refer, for the most part, to FIG. 4, though other figures may be referred to for clarification.

Beginning with an empty grill assembly, a user may find it in a closed configuration with handles 12 inserted into insertion sleeves 34 and insertion openings 44, and engagement members 60 within engagement openings 62, as shown in the solid line depiction of FIG. 4. The two sets of engagement elements may keep the top and bottom grill members stably, yet removably fastened together. To place a food item within the central enclosure 48, a user removes the handles 12 from the insertion sleeves 34 causing the tips 36 of the handle's insertion rods to be withdrawn from the insertion openings 44 in the engagement wall 46*b* of the top grill member 30. This action releases one of the two engagement mechanisms holding the grill members 30, 32 together, and allows the two grill members to be moved apart as denoted by movement arrow 66.

Opening the grill body is facilitated by using one or both handles to lift the top grill member off the bottom grill member. The rods 18 of handles 12 may be designed to fit into any of the grill openings 54, such that inserting the rods into the openings will allow that grill member to be moved in a direction of the user's choosing. In the embodiment of the present disclosure, the grill member that is moved may need to be moved at an angle; the presence of the second engagement mechanism (preferably including the engagement members 60 and their associated openings 62) inhibit direct upward movement of the moved grill member of the grill body. Moving the grill member by rotating it to an open angle will allow the engagement members 60 to release from the engagement openings 62 in such a way that the two grill members of the grill body may be completely separated. With the two grill members of the grill body separated, the food items to be cooked are easily positioned within the central enclosure.

Reversing the above-described opening procedure allows the two grill members of the grill body to be securely and removably fastened together. Using one or more of the handles to manipulate the positioning of the pieces, the top grill member of the grill body is placed at an angle relative to the bottom grill member, and the engagement members 60 and engagement openings 62 are placed opposed to each other. Rotating the top grill member 30 down toward the bottom grill member 32 as denoted by arrow 66 causes insertion of the engagement members into the engagement openings, and simultaneously brings the bores 35 of the insertion sleeves 34 into alignment with their associated insertion openings 44 on the top grill member. Finally, inserting the handles 12 into the insertion sleeves such that the tips of the handle insertion rods extend through the insertion openings of the top grill member completes the engagement process. The two grill members of the grill body are now securely (but removably) fastened together for use. In the case where insertion openings 44 and engagement openings 62 are of comparable size and placed symmetrically on opposite ends of the top grill member 30, as present in the preferred embodiment of the present disclosure, then top grill member 30 may be reversibly installed relative to bottom grill member 32. This arrangement may be noted when comparing FIG. 2 with FIG. 5 or FIG. 6.

There are other useful characteristics which follow from the grill assembly design described in the present disclosure. One advantage of the depicted embodiment is that the handles, being made is such a way that they are removably inserted into the grill body, may be removed during the cooking process after the grill body has been placed upon a barbecue, cooker or other heat source. For example, placing the grill assembly in a barbecue or other cooker that has a cover which may be opened and/or closed might inhibit movement of the cover if the handles are present in the insertion bodies. However, removing the handles of the grill assembly after placing the grill body in the barbecue or cooker may allow the cover of the barbecue or other cooker to be freely closed and may allow all the generated heat to be maintained within the barbecue or cooker, speeding the cooking process.

A second benefit of the preferred embodiment of the present disclosure involves the safety of the user. Because the handles of the preferred embodiment are removable, they may be outside of or away from the barbecue or cooker during the cooking process and may stay cool to the touch. Cool handles may be safer for the user and may obviate the need for the user to grasp them with hot pads or while wearing a heat-resistant hand covering, before moving the grill assembly from one position to another. Avoiding the use of hot pads or hand coverings, on the part of the user, also facilitates the ease of use of the grill assembly and may also make accidents less likely to occur.

Another benefit of the design of the preferred embodiment is the ease with which the grill assembly may be turned over. In order for efficient heating of both sides of a food item to occur, it may be desirable to turn the food partway through the cooking process. Since the grill assembly may sit stably with either side of the grill body contacting the cooking surface, it is a simple matter to turn the grill body over while the food is contained within the central enclosure, instead of opening the grill body and turning over the food. In addition, the design of the rods of the handles in the present disclosure presents a distinct advantage for turning over the grill assembly. As was noted earlier, the grill body has handle engagement structures that hold the grill body engagement ends of the grill body handles in a rotational relationship to the grill body. In the illustrated embodiment, the handle's insertion rods rotate within the cylindrical bores of the projecting insertion sleeves on the grill body's bottom grill member 32. This means that the grill body may rotate freely on the handles while the user holds or lifts the grill body. If the two handles are grasped in the hands of a user, turning over the grill assembly may be performed without the user needing to either release the handles or alter the user's handhold. This feature may prevent a user from performing a movement which might cause biomechanical strain (such as a user rotating their wrists while holding a heavy object in their hands).

Because the two handles form a stable gripping platform, and because the handles rotate freely in the grill body, turning food by turning over the entire grill assembly becomes an especially easy, controlled exercise in the illustrated two handled version of the invention. It is also possible to turn the grill body with one handle only. For example, a user may insert one handle into the grill assembly and rotate the assembly with another implement that is not the second handle. The second implement may be a spatula, a knife, a fork, or some other appropriate tool.

A benefit of the particular grill body design of the illustrated embodiment relates to the ability of the grill assembly to maintain its functionality when it is heated. Grill openings 54 may be disposed along the peripheries of the top grill member 30 and bottom grill member 32 to prevent warping of the grill assembly under extremes of heat exposure. Placing grill openings 54 so that they are near, and parallel to, the peripheries of the top and bottom grill members allows for the center sections of the top and bottom grill members to be structurally isolated from the peripheries of the grill members. This further allows for heat-induced expansion of the center sections of the top and bottom grill members to occur without causing binding of the top and bottom grill members. Although the described embodiment shows grill openings oriented perpendicular to other grill openings, it is understood that other dispositions of the grill openings may be possible in different applications without departing from the spirit of the present disclosure.

A similar prevention of heat-induced expansion and binding may be obtained by using an alternative construction of the center section of the top grill member 30 and bottom grill member 32. FIG. 5 shows generally, at 100, an alternative embodiment of the grill assembly of the present disclosure, where the components are numbered similarly to the corresponding parts shown in FIGS. 1-4, with the addition of a preceding "1". As shown in FIG. 5, the center sections of the top and bottom grill members may be constructed of an interwoven wire mesh 168 to allow for thermal expansion while still keeping contained the food items within the grill assembly. Similar to FIG. 5, FIG. 6 shows generally, at 200, another alternative embodiment of the grill assembly of the present disclosure, where the components are numbered similarly to the corresponding parts shown in FIGS. 1-5, with the prefix being a leading "2". As shown in FIG. 6, the center sections of the top and bottom grill members may be constructed of a series of straight wires 270 to allow for thermal expansion while still keeping contained the food items within the grill assembly.

Although the present invention has been shown and described with reference to the foregoing operational principles and preferred embodiments, it will be apparent to those skilled in the art that various changes in form and detail may be made without departing from the spirit and scope of the invention. The present invention is intended to embrace all such alternatives, modifications and variances that fall within the scope of the appended claims.

What is claimed is:

1. A grill assembly for cooking food items over a heat source, comprising
a grill body capable of holding food items,
a pair of grill body handles, each handle having a grip end and a grill body engagement end, and
two spaced apart handle engagement structures on said grill body, each of said handle engagement structures being adapted to hold the grill body engagement end of one of said grill body handles such that the engagement ends of the grill body handles freely rotate within said handle engagement structures and said grill body handles being removably insertable into the handle engagement structures of said grill body, whereby said grill body can be turned over on the handles while holding the grip end of the handles, and
wherein said grill body is comprised of a pair of grill members that can be joined together for holding food items, and wherein, after said grill members are joined together, said grill body handles extend through and act to hold said grill members in place when said handles are inserted into the handle engagement structures of said grill body.

2. A grill assembly for cooking food items over a heat source, comprising
a generally planar grill body capable of holding food items, said grill body having an engagement side edge,
at least two elongated grill body handles, each of said grill body handles having a grip end and an insertion rod end, and
at least two spaced apart insertion points on the engagement side edge of said grill body, each of said insertion points presenting an opening sized to slidably receive the insertion rod end of one of said grill body handles such that the insertion rod ends of said grill body handles can be inserted into and made to freely rotate within the engagement side edge of said grill body at said insertion points, and such that said grill body can be turned over on said handles, and
wherein said grill body is comprised of a pair of generally planar grill members that can be joined together for capturing food items between the grill members, each of said grill members having engagement walls that overlap when the grill members are joined together to form the engagement side edge of said grill body, and wherein, after said grill members are joined together, said grill body handles extend through and hold together the engagement walls thereof when the insertion rod end of each of said handles is inserted into the engagement side edge of said grill body at said insertion point.

3. A grill assembly for cooking food items over a heat source, comprising
a generally planar grill body capable of holding food items, said grill body having an engagement side edge,
at least two elongated grill body handles, each of said grill body handles having a grip end and an insertion rod end, and
an insertion structure on the engagement side edge of said grill body, said insertion structure providing at least two insertion points for slidably receiving the insertion rod ends of said grill body handles such that the insertion rod ends of said grill body handles can be inserted into, and such that the grill body handles can be freely rotated within the engagement side edge of said grill body at said insertion points while holding the grip ends of the handles, whereby said grill body can be readily turned over by rotating the grill body on the handles,
wherein said grill body is comprised of a pair of generally planar grill members that can be joined together for capturing food items, each of said grill members having an engagement wall that is substantially perpendicular to the plane of said grill members, and wherein the engagement walls of said grill members overlap when the grill members are joined together to form the engagement side edge of said grill body, and further wherein, when the grill members are joined together and when said handles are inserted into said insertion body at said insertion points, the insertion rod ends of said grill body handles extend through the overlapping engagement surfaces of said grill members so as to hold said grill members in a closed position.

4. A grill assembly for cooking food items over a heat source, comprising
a grill body capable of holding food items, said grill body comprised of a pair of generally planar grill members that can be joined together for capturing food items between the grill members, each of the grill members having engagement walls that overlap when the grill members are joined together to form an engagement side edge of said grill body,
at least two elongated grill body handles, each of said grill body handles having a grip end and an insertion rod end, and
at least two spaced apart insertion points on the engagement side edge of said grill body, said insertion points each presenting an opening sized to slidably receive the insertion rod end of one of said grill body handles such that the insertion rod end can be inserted into and made to rotate within the engagement side edge of said grill body at each of said insertion points such that said grill body can be turned over on said handles, and wherein after said grill members are joined together said grill body handles extend through and hold together the engagement walls thereof when the insertion rod end of each of said handles is inserted into the engagement side edge of said grill body at said insertion points.

5. The grill assembly of claim 4 wherein said grill body has a generally rectangular shape.

6. The grill assembly of claim 4 wherein the insertion rod end of each of said grill body handles includes at least one protrusion for limiting the depth of insertion of said insertion rod end into the engagement side edge of said grill body at each of said insertion points.

7. The grill assembly of claim 4 wherein the insertion rod end of each of said grill body handles includes at least one visual indicator for indicating the depth of insertion of said insertion rod end into the engagement side edge of said grill body at each of said insertion points.

* * * * *

UNITED STATES PATENT AND TRADEMARK OFFICE
CERTIFICATE OF CORRECTION

PATENT NO. : 7,717,029 B2
APPLICATION NO. : 10/917544
DATED : May 18, 2010
INVENTOR(S) : Thomas Rowe and Thomas J. Drach It is certified that error appears in the above-identified patent and that said Letters Patent is hereby corrected as shown below:

In column 1, line 48, "the facilitates" should read --that facilitates--.
In column 1, line 49, "other" should read --over--.
In column 1, line 51, "a such a" should read --such a--.
In column 2, line 29, "place" should read --placed--.
In column 2, line 29, "or" should be deleted between "on" and "the grill.".
In column 2, line 37, "suitably" should read --suitable--.
In column 2, line 40, "and" should be deleted between "another" and "optional.".
In column 5, line 67, "tip 36" should read --tips 36--.
In column 5, line 67, "is" should read --are--.

Signed and Sealed this

Nineteenth Day of October, 2010

David J. Kappos
*Director of the United States Patent and Trademark Office*